(12) United States Patent
Landre et al.

(10) Patent No.: US 9,738,393 B2
(45) Date of Patent: Aug. 22, 2017

(54) METHODS AND APPARATUS TO INCREASE A PAYLOAD CAPACITY OF AN AIRCRAFT

(71) Applicant: The Boeing Company, Chicago, IL (US)

(72) Inventors: Eric G. Landre, Bellevue, WA (US); Kent E. Karnofski, Lake Forest Park, WA (US); Derek T. Washio, Lynnwood, WA (US); Daniel Patrick Wehry Hould, Lake Forest Park, WA (US); Kevin S. Brown, Kent, WA (US)

(73) Assignee: The Boeing Company, Chicago, IL (US)

( * ) Notice: Subject to any disclaimer, the term of this patent is extended or adjusted under 35 U.S.C. 154(b) by 479 days.

(21) Appl. No.: 14/180,309

(22) Filed: Feb. 13, 2014

(65) Prior Publication Data

US 2015/0225090 A1     Aug. 13, 2015

(51) Int. Cl.
*B64D 33/08*     (2006.01)

(52) U.S. Cl.
CPC ................... *B64D 33/08* (2013.01)

(58) Field of Classification Search
CPC . F02C 7/12; F01D 5/181; F01D 5/185; F01D 25/08; F02K 1/822; B64D 1/16; B64D 33/08; B64D 27/10
See application file for complete search history.

(56) References Cited

U.S. PATENT DOCUMENTS

| | | | | |
|---|---|---|---|---|
| 4,936,389 A * | 6/1990 | MacDonald | ............. | B64D 1/16 137/398 |
| 6,481,211 B1 * | 11/2002 | Haas | ....................... | F01D 25/08 60/782 |
| 6,578,796 B2 * | 6/2003 | Maeda | .................... | B64D 1/16 244/136 |
| 6,672,075 B1 * | 1/2004 | Sandu | ..................... | F01D 5/088 415/114 |
| 7,316,207 B2 * | 1/2008 | Jenkins | .................... | F02B 47/02 123/25 B |
| 8,424,381 B1 * | 4/2013 | Lamphere | ............. | G01F 23/268 73/304 C |
| 8,496,201 B2 * | 7/2013 | Norton | ................... | B64D 33/08 165/41 |
| 2010/0242492 A1 * | 9/2010 | Sloat | ........................ | F02C 7/12 60/793 |
| 2014/0216088 A1 * | 8/2014 | Weber | .................... | B64D 37/34 62/239 |

* cited by examiner

*Primary Examiner* — Arun Goyal
(74) *Attorney, Agent, or Firm* — Hanley, Flight & Zimmerman, LLC

(57) ABSTRACT

Methods and apparatus to increase a payload capacity of an aircraft are disclosed herein. An example method includes receiving a selection via a control display unit to employ a fluid delivery system during takeoff of an aircraft. The fluid delivery system includes a tank disposed on the aircraft. The example method also includes automatically controlling, via a fluid management system including a processor, a flow of the water from the tank during takeoff in response to the selection. The water is to cool an engine heat source of the aircraft.

15 Claims, 12 Drawing Sheets

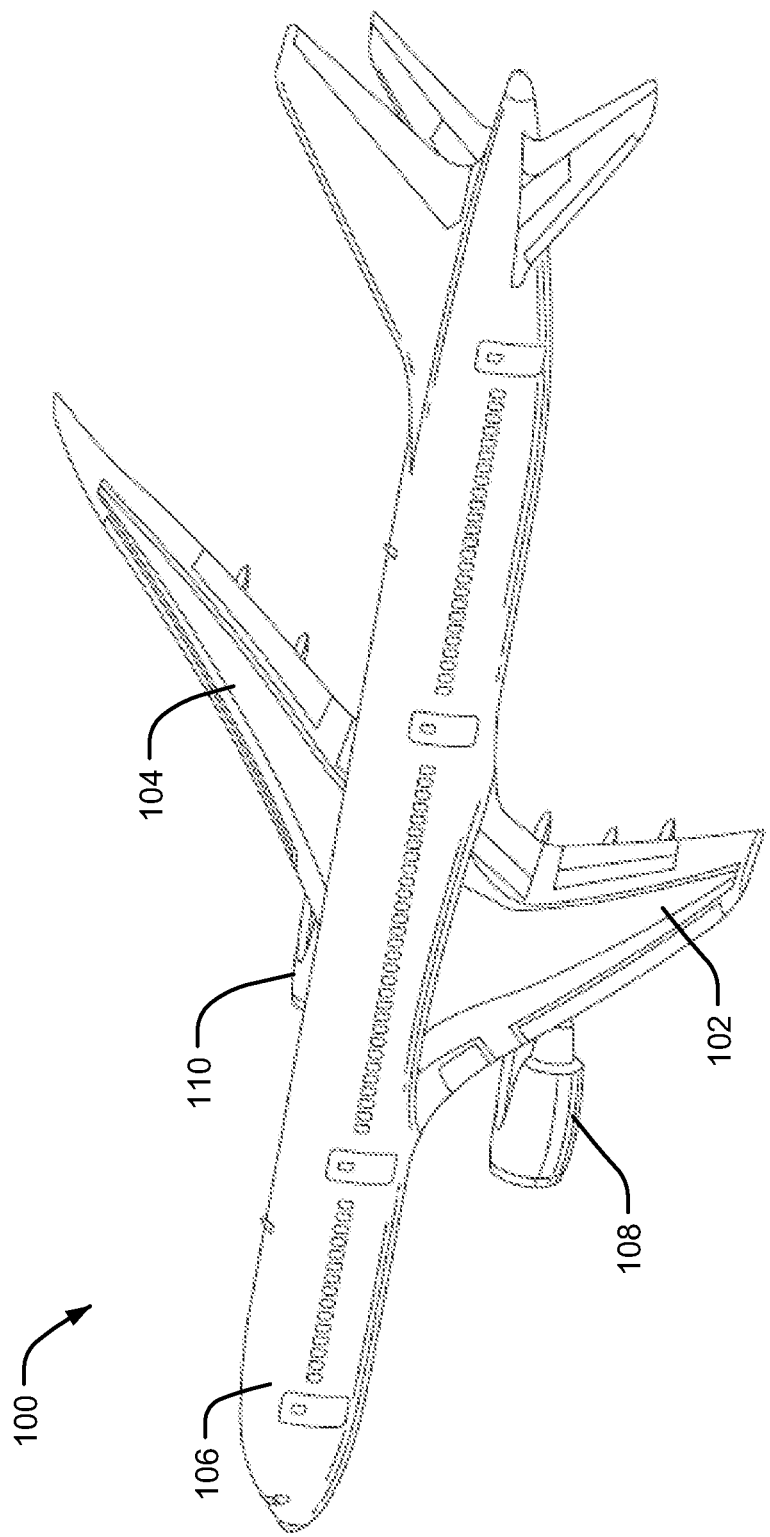

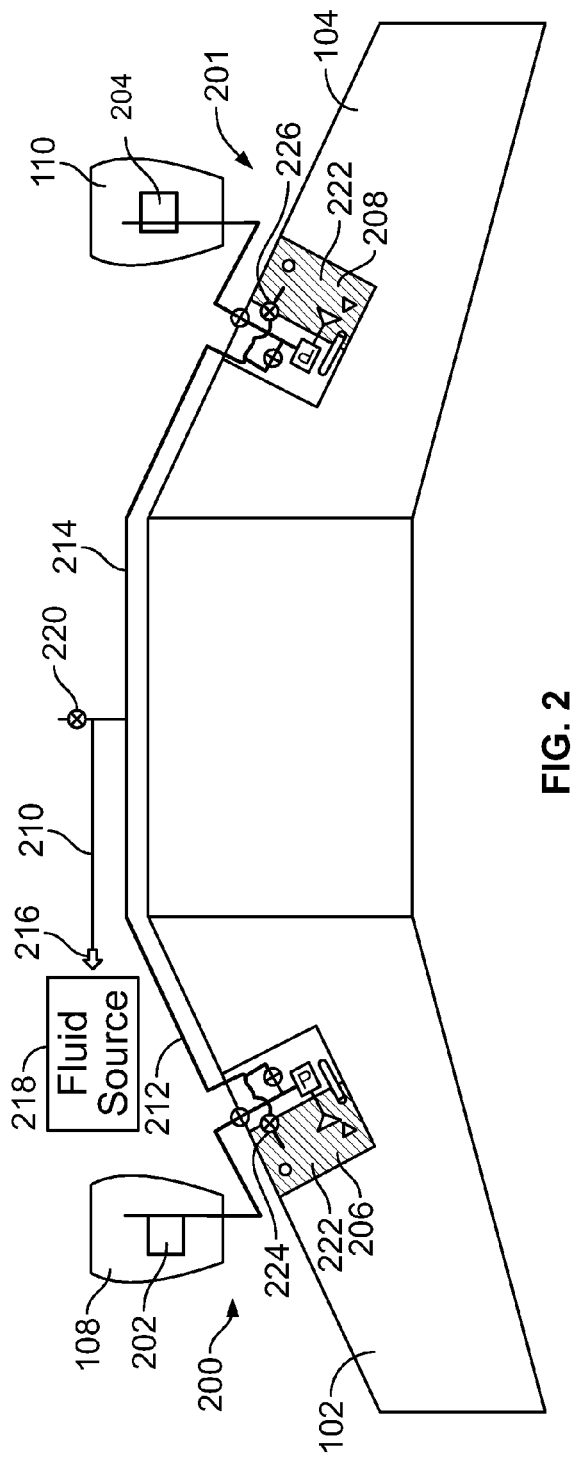
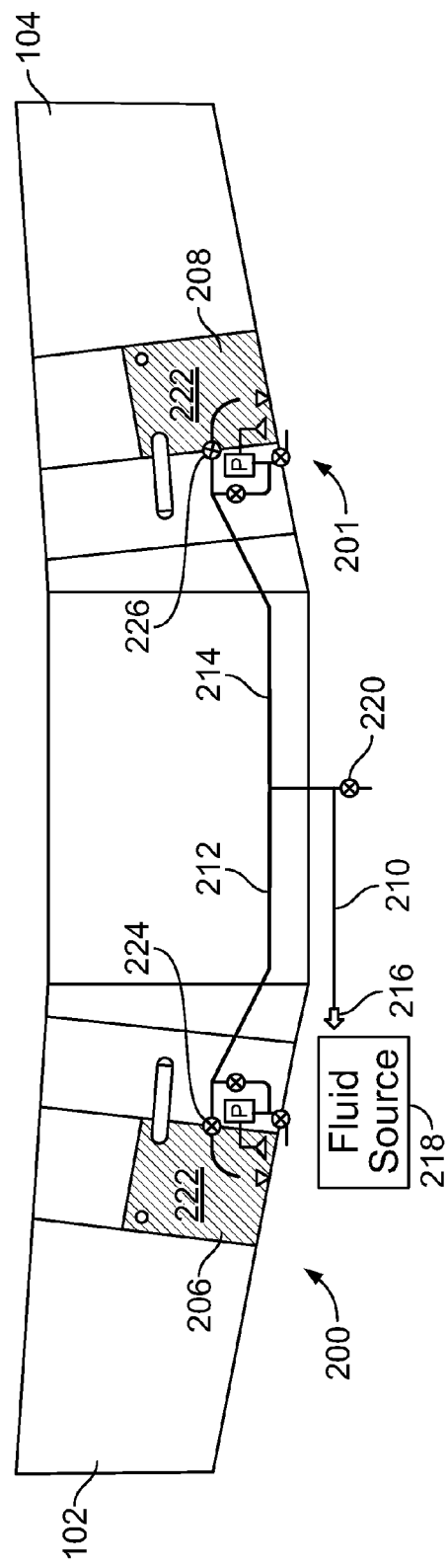

METHODS AND APPARATUS TO INCREASE A PAYLOAD CAPACITY OF AN AIRCRAFT

FIELD

This disclosure relates generally to aircraft control systems and, more particularly, to methods and apparatus to increase a payload capacity of an aircraft.

BACKGROUND

When an aircraft takes off in a high temperature environment (e.g., an environment having a temperature greater than 40 degrees Celsius), engine material temperature thresholds typically limit an amount of thrust that may be generated by one or more engines on the aircraft. As a result, a payload capacity of the aircraft is typically reduced when the aircraft is to take off in the high temperature environment.

SUMMARY

An example method disclosed herein includes receiving a command in a fluid management system of an aircraft to employ a fluid delivery system during takeoff of the aircraft. The fluid delivery system is to cool an engine heat source. The example method also includes automatically activating a pump via the fluid management system to flow fluid from a first fluid tank of the fluid delivery system to cool the engine heat source during takeoff. The example method further includes substantially purging the aircraft of the fluid during flight of the aircraft.

An example apparatus disclosed herein includes a tank disposed on an aircraft, and a pump in fluid communication with the tank. The pump is to pump water from the tank to cool an engine heat source. The example apparatus also includes a fluid management system including a processor to automatically control the pump to control flow of the water during takeoff of the aircraft.

An example method disclosed herein includes receiving a selection via a control display unit to employ a fluid delivery system during takeoff of an aircraft. The fluid delivery system includes a tank disposed on the aircraft. The example method also includes automatically controlling, via a fluid management system including a processor, a flow of the water from the tank during takeoff in response to the selection. The water is to cool an engine heat source of the aircraft.

BRIEF DESCRIPTION OF THE DRAWINGS

FIG. 1 illustrates an example aircraft which may be used to implement example methods and apparatus disclosed herein.

FIG. 2 is a schematic of an example first fluid delivery system and an example second fluid delivery system disclosed herein from a first perspective.

FIG. 3 is a schematic of the example first fluid delivery system and the example second fluid delivery system of FIG. 2 from a second perspective.

Figure 4:
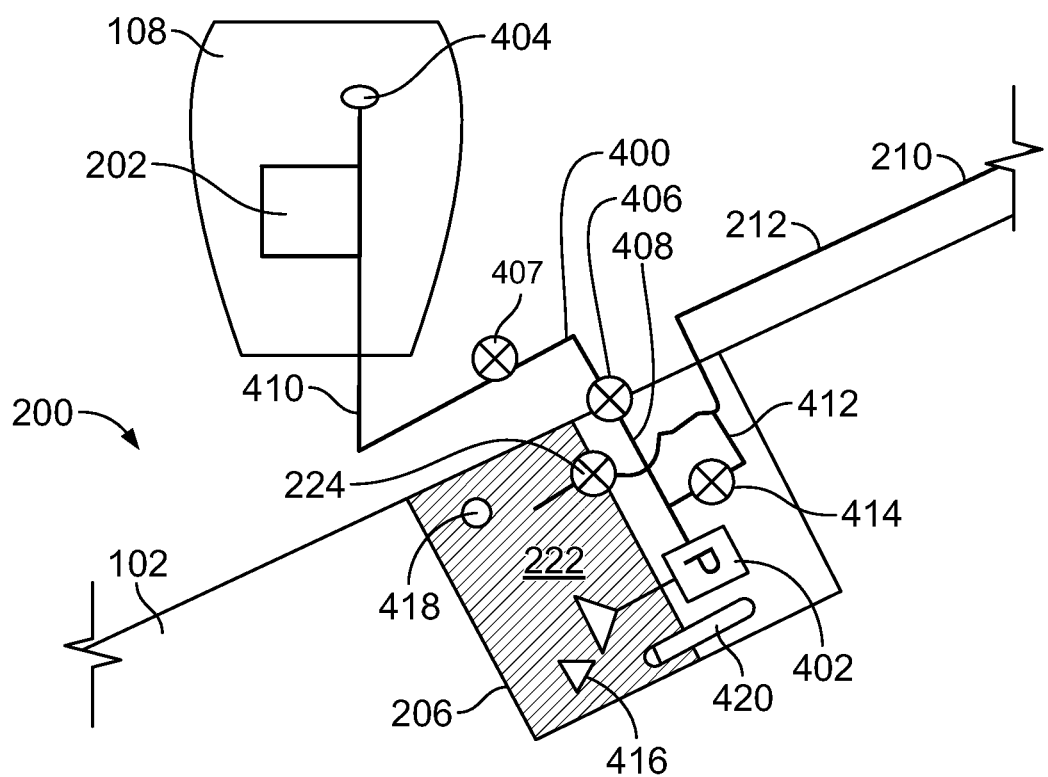
FIG. 4 illustrates the example first fluid delivery system of FIGS. 2-3.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus to increase a payload capacity of an aircraft are disclosed herein. An example aircraft disclosed herein includes a fluid delivery system that is controlled by a fluid management system to cool an engine heat source during takeoff of the aircraft. As used herein, takeoff may involve one or more events to enable the aircraft to become airborne and reach a cruising phase of flight. For example, takeoff may involve taxiing, increasing a speed of the aircraft on the ground, becoming airborne, and reaching a given altitude. Thus, as used herein, the term "during takeoff" refers to any period of time between starting an engine of the aircraft and the aircraft reaching a cruise altitude. By cooling the engine heat source during takeoff, the payload capacity of the aircraft increases, for example, in high temperature environments (e.g., environments having temperatures greater than forty degrees Celsius) and/or a life of an engine of the aircraft increases.

In some examples, during pre-flight planning, one or more crew members of the aircraft may input a selection via a control display unit of the aircraft to employ the fluid delivery system to cool the engine heat source during takeoff. If the selection to cool the engine heat source during takeoff is received, the fluid management system may automatically operate the fluid delivery system to cool the engine heat source upon detecting an occurrence of a takeoff event such as, for example, initiation of a rolling takeoff. Thus, once the selection is input by the crew member(s), the fluid management system may operate the fluid delivery system to cool the engine heat source and, thus, increase the payload capacity of the aircraft without further action of the crew member(s) with respect to the fluid management system or the fluid delivery system.

In some examples, the fluid delivery system includes a pump in fluid communication with a fluid tank disposed on the aircraft. The fluid tank may be filled with a fluid such as, for example, water. In some examples, the fluid delivery system includes a plurality of valves to control fluid flow into and from the fluid tank.

The example fluid management system may be communicatively coupled to the pump and the valves to control a flow of the fluid from the tank to cool the engine heat source during takeoff. In some examples, the fluid management system substantially purges the aircraft of the fluid during flight. For example, one or more of the valves may be drain valves, and the drain valves may be opened during flight to drain the fluid tank and/or one or more flowlines in fluid communication with the fluid delivery system. In some examples, some of the fluid is pumped through the fluid delivery system and exhausted from the aircraft during flight via an exhaust port downstream of the engine heat source.

FIG. 1 is a perspective view of an example aircraft 100, which may be used to implement example methods and apparatus disclosed herein. In the illustrated example, the aircraft 100 includes a first wing 102, a second wing 104 and a fuselage 106. The example aircraft 100 of FIG. 1 includes a first engine 108 and a second engine 110. The example first engine 108 is coupled to first wing 102. The example second engine 110 is coupled to the second wing 104. While the following examples are discussed in conjunction with the example aircraft 100 of FIG. 1, other examples may be implemented on any type of aircraft.

FIGS. 2-3 are schematics of an example first fluid delivery system 200 and an example second fluid delivery system 201 disclosed herein, which are employed by the example aircraft 100 of FIG. 1. FIG. 2 illustrates the example first fluid delivery system 200 and the example second fluid delivery system 201 from a perspective above the example aircraft 100. FIG. 3 illustrates the example first fluid delivery system 200 and the example second fluid delivery system 201 from a perspective behind the example aircraft 100. The example first fluid delivery system 200 of FIGS. 2-3 cools a first heat source 202 of the first engine 108 (referred to herein as a "first engine heat source") during takeoff of the example aircraft 100. The example second fluid delivery system 201 of FIGS. 2-3 cools a second heat source 204 of the second engine 110 (referred to herein as a "second engine heat source") during takeoff of the example aircraft 100. The first engine heat source 202 and the second engine heat source 204 may be any heat sources associated with the first engine 108 and the second engine 110, respectively, such as, for example, compressors, combustors, and/or any other heat sources.

The example first fluid delivery system 200 of FIGS. 2-3 includes a first tank 206 disposed in the first wing 102. The example second fluid delivery system 201 includes a second tank 208 disposed in the second wing 104. In the illustrated example, a fill flowline 210 having a first branch 212 and a second branch 214 is fluidly coupled to the first tank 206 and the second tank 208 via the first branch 212 and the second branch 214, respectively. The example fill flowline 210 of FIGS. 2-3 includes a fill port 216 to fluidly couple the fill flowline 210 to a fluid source 218 such as, for example, a fluid supply tank located at an airport, a fluid supply tank disposed on a vehicle, and/or any other fluid source. The example fill flowline 210 includes a shutoff valve 220, which may be selectively opened to enable the first tank 206 and the second tank 208 to receive fluid from the fluid source 218 or selectively closed to prevent fluid 222 in the first fluid delivery system 200 and the second fluid delivery system 201 from flowing out of the aircraft 100 via the fill flowline 210. In the illustrated example, a first fill valve 224 is fluidly coupled to the first branch 212 to enable the fluid 222 to flow from the first branch 212 into the first tank 206 and prevent the fluid 222 from flowing from the first tank 206 into the fill flowline 210. An example second fill valve 226 is fluidly coupled to the second branch 214 to enable the fluid 222 to flow from the second branch 214 into the second tank 208 and prevent the fluid 222 from flowing from the second tank 208 into the fill flowline 210.

In the illustrated examples, the first fluid delivery system 200 is substantially a mirror image of the second fluid delivery system 201. Therefore, the following description of the first fluid delivery system 200 may be applied to the example second fluid delivery system 201. Thus, to avoid redundancy, the second fluid delivery system 201 is not separately described herein.

FIG. 4 illustrates the example first fluid delivery system 200 of FIGS. 2-3. The example first fluid delivery system 200 includes a heat source feed flowline 400 in fluid communication with the first tank 206. In the illustrated example, a pump 402 is in fluid communication with the first tank 206 and the heat source feed flowline 400 to pump fluid from the first tank 206 into the heat source feed flowline 400 to cool the first engine heat source 202. The example heat source feed flowline 400 of FIG. 4 is fluidly coupled to an exhaust port 404 to exhaust the fluid 222 from the aircraft 100 downstream of the first engine heat source 202. In some examples, the fluid 222 is water, and heat from the first engine heat source 202 vaporizes the water. As a result, in some examples, water vapor and/or steam exhausts from the exhaust port 404.

In the illustrated example, a first supply valve 406 is fluidly coupled to the heat source feed flowline 400 between the pump 402 and the first engine 108 to control a flow of the fluid 222 through the heat source feed flowline 400. For example, the first supply valve 406 may be closed to prevent the fluid 222 in the first tank 206 from flowing through the heat source feed flowline 400, or the first supply valve 406 may be opened to permit the fluid 222 to flow through the heat source feed flowline 400 to cool the first engine heat source 202. In some examples, a second supply valve 407 is fluidly coupled to the heat source feed flowline 400 between the first supply valve 406 and the first engine heat source 202 to control the flow of the fluid 222 through the heat source feed flowline 400.

In some examples, the pump 402, the first supply valve 406 and the second supply valve 407 cooperate to prime the example the first fluid delivery system 200. For example, the pump 402 may be operated while the first supply valve 406 is open and the second supply valve 407 is closed to pressurize a first portion 408 of the heat source feed flowline 400 between the pump 402 and the second supply valve 407. During takeoff, the second supply valve 407 is opened to permit the fluid 222 to flow through a second portion 410 of the heat source feed flowline 400 downstream of the second supply valve 407. As a result, the fluid 222 cools the first engine heat source 202 and exhausts from the aircraft 100 via the exhaust port 404.

In some examples, the fluid 222 remaining in the example first fluid delivery system 200 after takeoff is purged from the example aircraft 100 during flight. The example first fluid delivery system 200 of FIG. 4 includes a drain line 412 in fluid communication with the heat source feed flowline 400 and the first branch 212 of the fill flowline 210. In the illustrated example, the fluid 222 in the heat source drain line 412 and the fill flowline 210 may be drained from the example aircraft 100 by opening a first drain valve 414 fluidly coupled to the drain line 412. The example first tank 206 of FIG. 4 includes a second drain valve 416 to enable the fluid 222 in the first tank 206 to be drained from the example aircraft 100. In some examples, the second drain valve 416 is positioned at a substantially lowest point of the first fluid delivery system 200 to enable the fluid 222 to be gravity fed through a drain in fluid communication with the second drain valve 416.

In the illustrated example, a fluid level sensor 418 is operatively coupled to the first tank 206. In some examples, the fluid level sensor 418 is used to determine an amount of the fluid 222 in the first tank 206. In some examples, a vent 420 is operatively coupled to the first tank 206 to control (e.g., relieve) pressure in the first tank 206 during flight.

Figure 5:
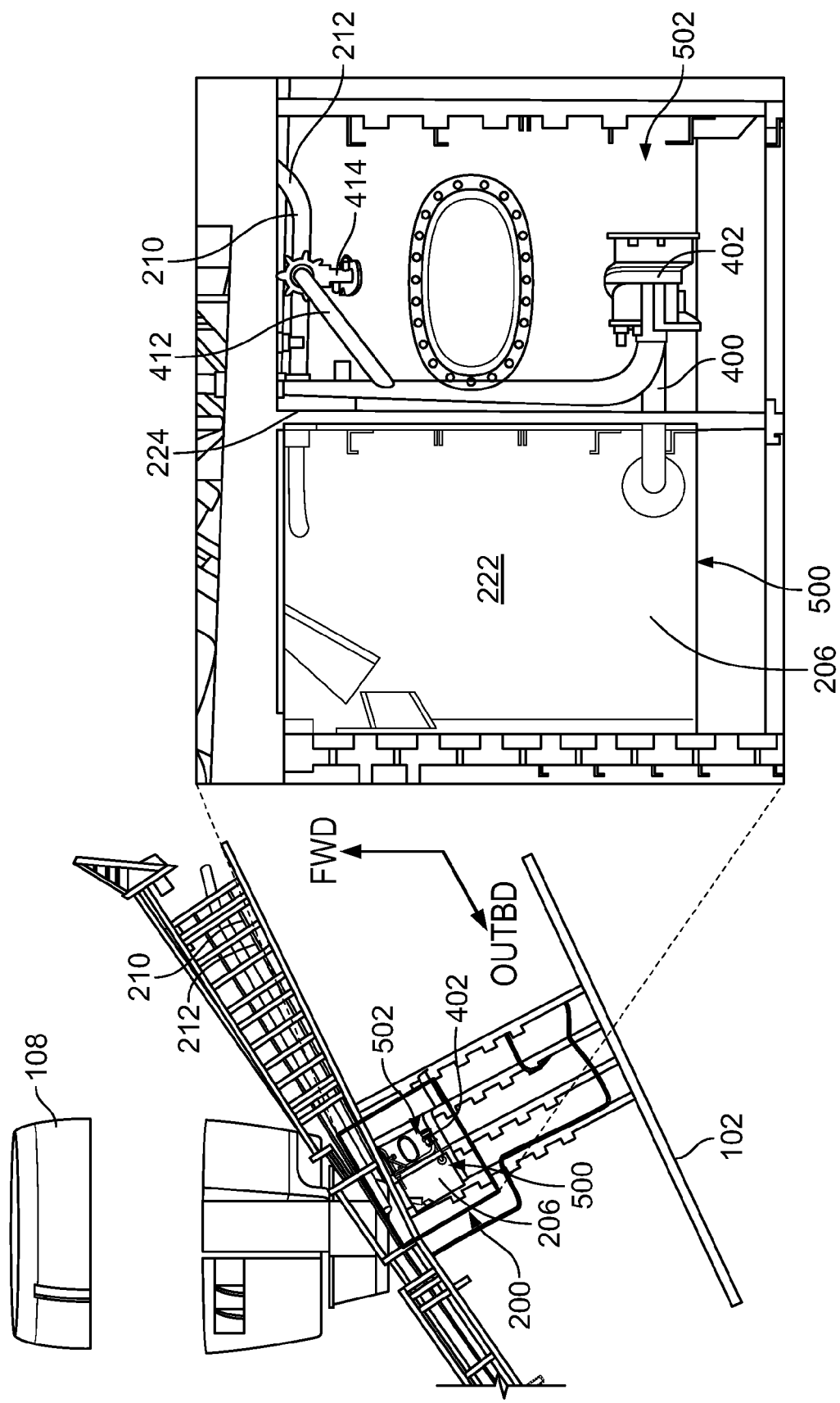
FIG. 5 illustrates an example implementation of the example aircraft 100 of FIG. 1 employing the example first fluid delivery system of FIGS. 2-4.

FIG. 5 illustrates an example implementation of the example first fluid delivery system 200 of FIGS. 2-4. In the illustrated example, the first tank 206 is disposed in a first dry bay 500 of the first wing 102. The example pump 402 is disposed in a second dry bay 502 of the first wing 102 adjacent the first dry bay 500. In the illustrated example, the second branch 214 of the fill flowline 210 extends substantially spanwise along the example first wing 102. In the illustrated example, the drain line 412 extends from the second branch 214 of the fill flowline 210 to the heat source feed line 400 such that the fluid 222 from the fill flowline 210 drains into the heat source feed line 400 downstream of the pump 402 when the first drain valve 414 is opened. Thus, in some examples, the fluid 222 in the fill flowline 210 bypasses the first tank 206 and is pumped out of the aircraft 100 via the exhaust port 404 downstream of the first engine heat source 202 to purge the fluid 222 in the fill flowline 210 from the aircraft 100. The above-noted implementation of the example first fluid delivery system 200 is merely an example. In other examples, one or more components of the first fluid delivery system 200 may be disposed in other locations on the aircraft 100. For example, the first tank 206 may be disposed in an aft cargo bay of the aircraft 100.

Figure 6:
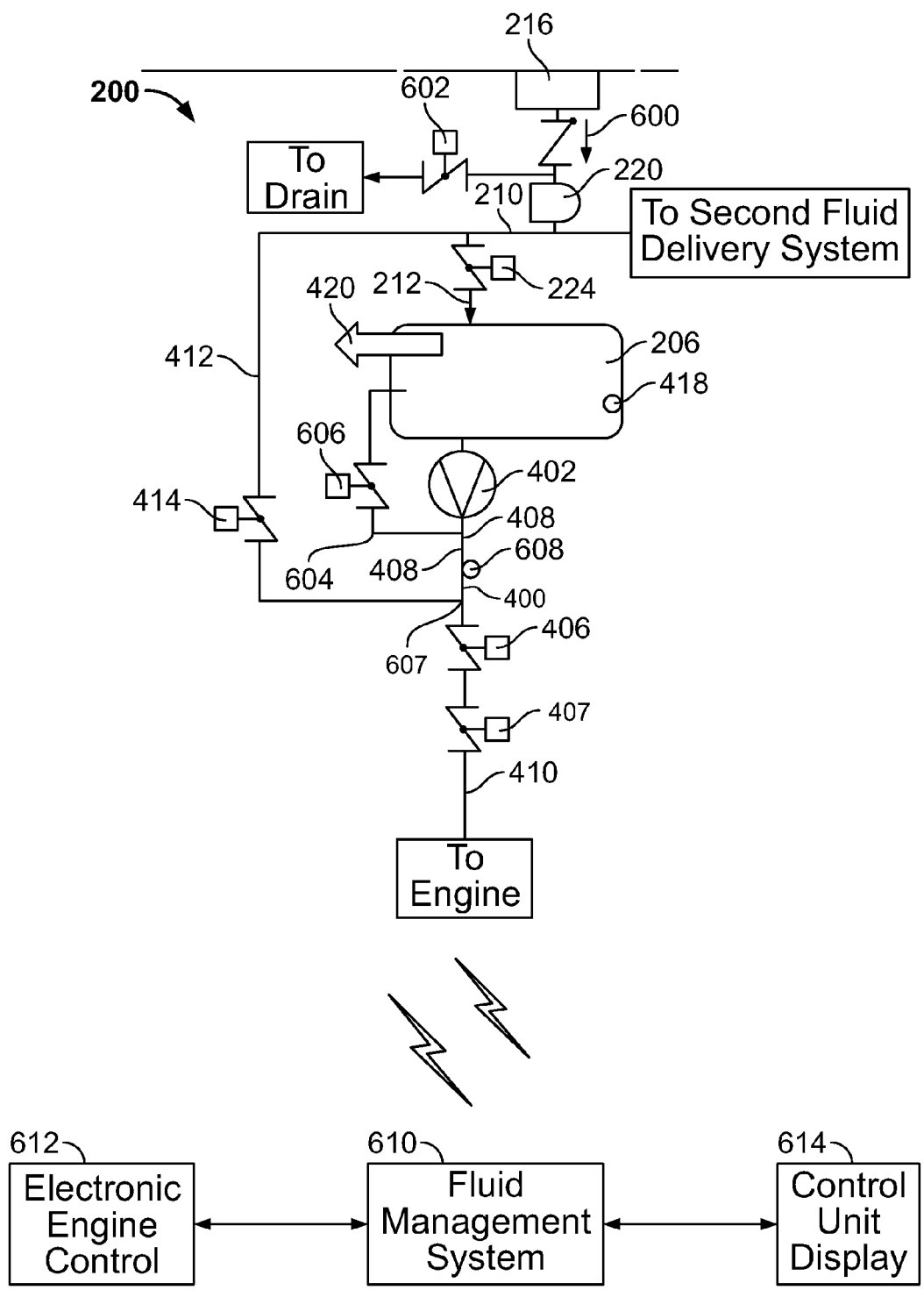
FIG. 6 is another schematic of the example first fluid delivery system of FIGS. 2-5.

FIG. 6 is a schematic of an example implementation of the first fluid delivery system 200 of FIGS. 2-5. In the illustrated example, the fill port 216 includes a check valve 600. The example fill flowline 210 includes a third drain valve 602 to enable the fill flowline 210 to be drained. For example, once the first tank 206 is filled via the fluid source 218 (FIG. 2), the fill flowline 210 may be drained by opening the third drain valve 602. In the illustrated example, the first fluid delivery system 200 includes a bypass line 604 in fluid communication with the first tank 206 and the first portion 408 of the heat source feed flowline 400. The example bypass line 604 includes a bypass valve 606 to enable the fluid 222 from the first tank 206 to bypass the pump 402. For example, when the bypass valve 606 opens, the fluid 222 flows from the tank 206 into the first portion 408 of the heat source feed flowline 400 via a junction 607 downstream of the pump 402 and upstream of the first supply valve 406. In some examples, a pressure sensor 608 is operatively coupled to the first portion 408 of the heat source feed flowline 400. The example pressure sensor 608 is used to determine a pressure of the fluid 222 in the first portion of the heat source feed flowline 400. As described in greater detail below, in some examples, the pressure of the fluid 222 in the first portion 408 of the heat source feed flowline 400 is used to determine if the example first fluid delivery system 200 is primed.

In the illustrated example, the first fluid delivery system 200 is automatically controlled by a fluid management system 610 employed by the example aircraft 100. For example, upon receiving a selection from a crew member prior to takeoff, the fluid management system 610 controls the first fluid delivery system 200 to cool the first engine heat source 202 during takeoff without further action from the crew member(s) of the aircraft 100. For example, the fluid management system 610 automatically controls the shutoff valve 220, the first fill valve 224, the pump 402, the first supply valve 406, the first drain valve 414, the second supply valve 407, the second drain valve 416, the third drain valve 602, the bypass valve 606 and/or other components of the first fluid delivery system 200 and/or the second fluid delivery system 201.

In some examples, the fluid management system 610 cooperates with an electronic engine control 612 to control the flow of the fluid 222 to cool the first engine heat source 202. For example, the electronic engine control 612 may control one or more components operatively coupled to the first fluid delivery system 200 and the first engine 108 such as, for example, the second supply valve 407. In some examples, the crew member inputs the selection via a control display unit 614 located in a cockpit of the aircraft 100. In some examples, the fluid management system 610 controls the first fluid delivery system 200 and the second fluid delivery system 201. In other examples, the aircraft 100 includes another fluid management system to control the second fluid delivery system 201.

The above-disclosed implementation of the first fluid delivery system 200 is merely an example and, thus, the first fluid delivery system 200 may be implemented in other ways without departing from the scope of this disclosure. For example, the first fluid delivery system 200 may include different components, additional components, fewer components, and/or one or more of components of the first fluid delivery system 200 may be arranged and/or configured in other ways. Further, although the example aircraft 100 includes the first fluid delivery system 200 and the second fluid delivery system 201, other aircraft may be implemented with other numbers of fluid delivery systems (e.g., 1, 3, 4, etc.).

Figure 7:
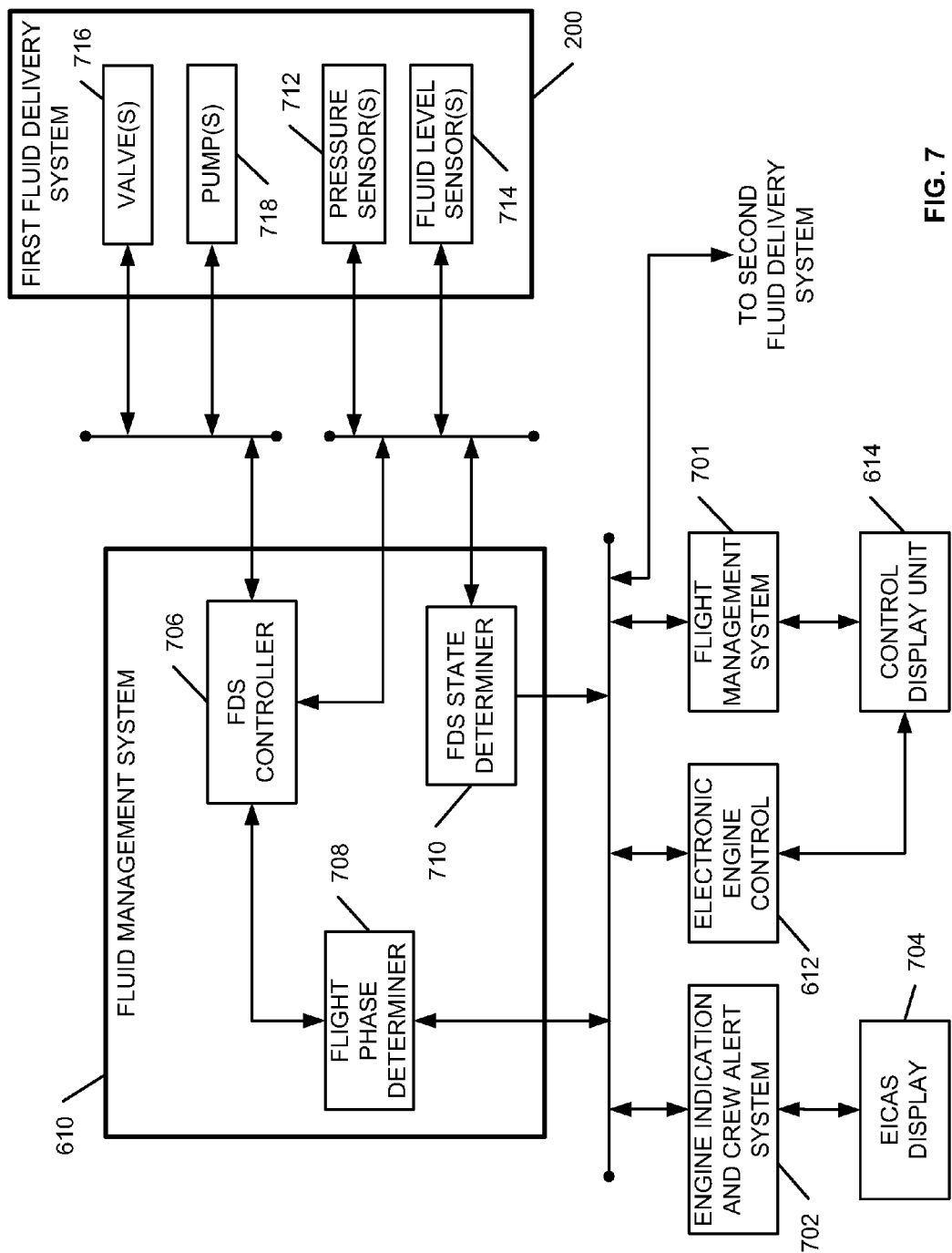
FIG. 7 is a block diagram of an example takeoff management system disclosed herein, which may be used to control the example first fluid delivery system and/or the example second fluid delivery system.

FIG. 7 is a block diagram of an example takeoff management system 700 disclosed herein. In the illustrated example, the takeoff management system 700 includes the example fluid management system 610 of FIG. 6, the example first fluid delivery system 200 of FIGS. 2-6, the example electronic engine control 612 of FIG. 6, the example control display unit 614 of FIG. 6, an example flight management system 701, an example engine indication and crew alert system (EICAS) 702, and an example EICAS display 704. In the illustrated example, the fluid management system 610 includes a fluid delivery system (FDS) controller 706, a flight phase determiner 708 and a fluid delivery system (FDS) state determiner 710.

The example electronic engine control (EEC) 612 controls the first engine 108. In some examples, the EEC 612 controls components and/or cooperates with the fluid management system 610 to control components operatively coupled to the first fluid delivery system 200 and the first engine 108 such as, for example, the second supply valve 407. In some examples, the EEC 612 and/or a thrust management computer controls the first engine 108 based on a takeoff thrust mode selected via the control display unit 614. For example, the EEC 612 may operate the first engine 108 in a normal thrust mode, a bump thrust mode, or a fluid cooling thrust mode. In some examples, the first engine 108 in the normal thrust mode generates a first thrust rating during takeoff, and the first engine 108 in the bump thrust mode generates a second thrust rating greater than the first thrust rating during takeoff. In the illustrated example, the first engine heat source 202 is cooled via the first fluid delivery system 200 during takeoff when the electronic engine control 612 operates first engine 108 in the fluid cooling thrust mode. As described in greater detail below, in, for example, high temperature environments (e.g., environments having temperatures above about 40 degrees Celsius), cooling the first engine heat source 202 during takeoff enables the first engine 108 to generate a third thrust rating greater than the second thrust rating.

The example flight management system 701 controls a flight plan of the example aircraft 100. In some examples, a crew of the aircraft 100 provides one or more inputs (e.g., makes on or more selections) via the control display unit 614 prior to takeoff to determine and/or set the flight plan. In some examples, the control display unit 614 includes an input device (e.g., a touchscreen, a keyboard, and/or any other input device) to enable the crew to provide inputs and/or selections associated with the flight plan. For example, the crew may use the input device of the control display unit 614 to select the takeoff thrust mode to be implemented via the EEC 612 during takeoff.

The example fluid management system 610 controls the example first fluid delivery system 200. In the illustrated example, the FDS controller 706 receives information from one or more pressure sensors 712 of the first fluid delivery system 200 such as, for example, the pressure sensor 608. The example FDS controller 706 also receives information from one or more fluid level sensor(s) 714 such as, for example, the fluid level sensor 418. The example FDS controller 706 of FIG. 7 is communicatively coupled to one or more valves 716 and pumps 718 of the first fluid delivery system 200. For example, the FDS controller 706 may be communicatively coupled to the shutoff valve 220, the first fill valve 224, the pump 402, the first supply valve 406, the first drain valve 414, the second supply valve 407, the second drain valve 416, the third drain valve 602, the bypass valve 606 and/or any other components of the first fluid delivery system 200. The example FDS controller 706 controls the valves 716 and the pumps 718. For example, the FDS controller 706 may open and/or close selected ones of the valves 716 and operate the pumps 718 to flow the fluid 222 from the first tank 206 to cool the first engine heat source 202. In some examples, the FDS controller 706 opens and/or closes selected ones of the valves 716 and operates the pumps 718 to prime the example first fluid delivery system 200. In some examples, the FDS controller 706 is communicatively coupled to and/or controls one or more components of the example second fluid delivery system 201.

The FDS state determiner 710 determines a status or state of the first fluid delivery system 200 and the second fluid delivery system 201. For example, the FDS state determiner 710 may determine a first fluid level status of the first tank 206 and a second fluid level status of the second tank 208. For example, the FDS state determiner 710 may determine that the first fluid level status is "Full" by determining that an amount of the fluid 222 in the first tank 206 is greater than a predetermined amount of fluid. In some examples, the FDS state determiner 710 determines that the first fluid level status is "Empty" by determining that the amount of the fluid 222 in the first tank 206 is less than the predetermined amount. In other examples, the FDS state determiner 710 determines other statuses of the first fluid delivery system 200 and/or the second fluid delivery system 201. In the illustrated example, the FDS state determiner 710 determines the amount of the fluid 222 in the first tank 206 based on information generated via the fluid level sensors 714.

The example EICAS 702 includes instrumentation of one or more engine and/or aircraft parameters and generates messages (e.g., warnings) and displays the messages via the EICAS display 704. In some examples, the EICAS 702 displays a first message based on the first fluid level status, the second fluid level status and the selected takeoff thrust mode. For example, if the fluid cooling thrust mode is selected via the control display unit 614 and both the first fluid level status and the second fluid level status are "Full," the EICAS 702 generates a message such as "TO W" to indicate that the aircraft 100 is to employ the fluid cooling thrust mode during takeoff. If the fluid cooling thrust mode is selected and one or both of the first fluid level status and the second fluid level status are "Empty," the EICAS 702 generates a message such as "Do Not Dispatch" to indicate that the aircraft 100 is not to takeoff without filling one or both of the first tank 206 and the second tank 208 with fluid. In some examples, if either the normal thrust mode or the bump thrust mode is selected and one or both of the first fluid level status and the second fluid level status are "Full," the EICAS 702 generates a message such as "Do Not Dispatch" to indicate that the aircraft 100 is to be purged of the fluid 222 prior to takeoff.

The example flight phase determiner 708 detects takeoff events and flight phases of the aircraft 100, which may be used to determine when the example FDS controller 706 is to operate the first fluid delivery system 200 to prime the first fluid delivery system, cool the first engine heat source 202 and/or perform other actions. In some examples, the FDS controller 706 initiates operation (e.g., pumps the fluid 222 via the pump(s) 718, opens and/or closes one or more of the valves 716, etc.) of the first fluid delivery system 200 upon an occurrence of a takeoff event, when the aircraft 100 enters a flight phase of the aircraft 100, and/or at a predetermined time relative to an occurrence of a takeoff event and/or entrance of the aircraft 100 into a flight phase. Example takeoff events include receiving a selection of the fluid cooling thrust mode, providing a predetermined amount of power to the first engine 108, initiating a rolling takeoff, and/or other events. Example flight phases include a takeoff roll phase, a climbing phase, and/or other flight phases.

In some examples, the FDS controller 706 initiates operation of the first fluid delivery system 200 to prime the first fluid delivery system 200 when the fight phase determiner 708 determines that the fluid cooling thrust mode is selected via the control display unit 614. In other examples, the FDS controller 706 initiates operation of the first fluid delivery system 200 to prime the first fluid delivery system 200 at other times. In some examples, the FDS controller 706 may initiate operation of the first fluid delivery system 200 to cool the first engine heat source 202 when the flight phase determiner 708 determines that the aircraft 100 is in the takeoff roll phase (e.g., when the aircraft 100 initiates and/or undergoes a rolling takeoff). In other examples, the FDS controller 706 initiates operation of the first fluid delivery system 200 to cool the first engine heat source 202 at other times.

In some examples, the FDS controller 706 controls the first fluid delivery system 200 to purge the fluid 222 from the aircraft 100 when the flight phase determiner 708 detects a transition of the aircraft 100 from the takeoff roll phase to a climbing phase. For example, the FDS controller 706 may open the first drain valve 414 to drain the fluid 222 in the heat source drain line 412 and the fill flowline 210 from the example aircraft 100, open the second drain valve 416 to drain the fluid 222 in the first tank 206 from the example aircraft 100, and operate the pump 402 to exhaust the fluid 222 in the heat source feed flowline 400 from the aircraft 100 via the exhaust port 404.

In some examples, the FDS controller 706 controls the first fluid delivery system 200 to purge the fluid 222 from the aircraft 100 when the flight phase determiner 708 determines that a predetermined amount of time (e.g., five minutes) has passed since the occurrence of the takeoff event and/or the detection of the flight phase that prompted the FDS controller 706 to initiate operation of first fluid delivery system 200 to cool the first engine heat source 202. In other examples, the FDS controller 706 controls the first fluid delivery system 200 to purge the aircraft 100 of the fluid.

Figure 8:
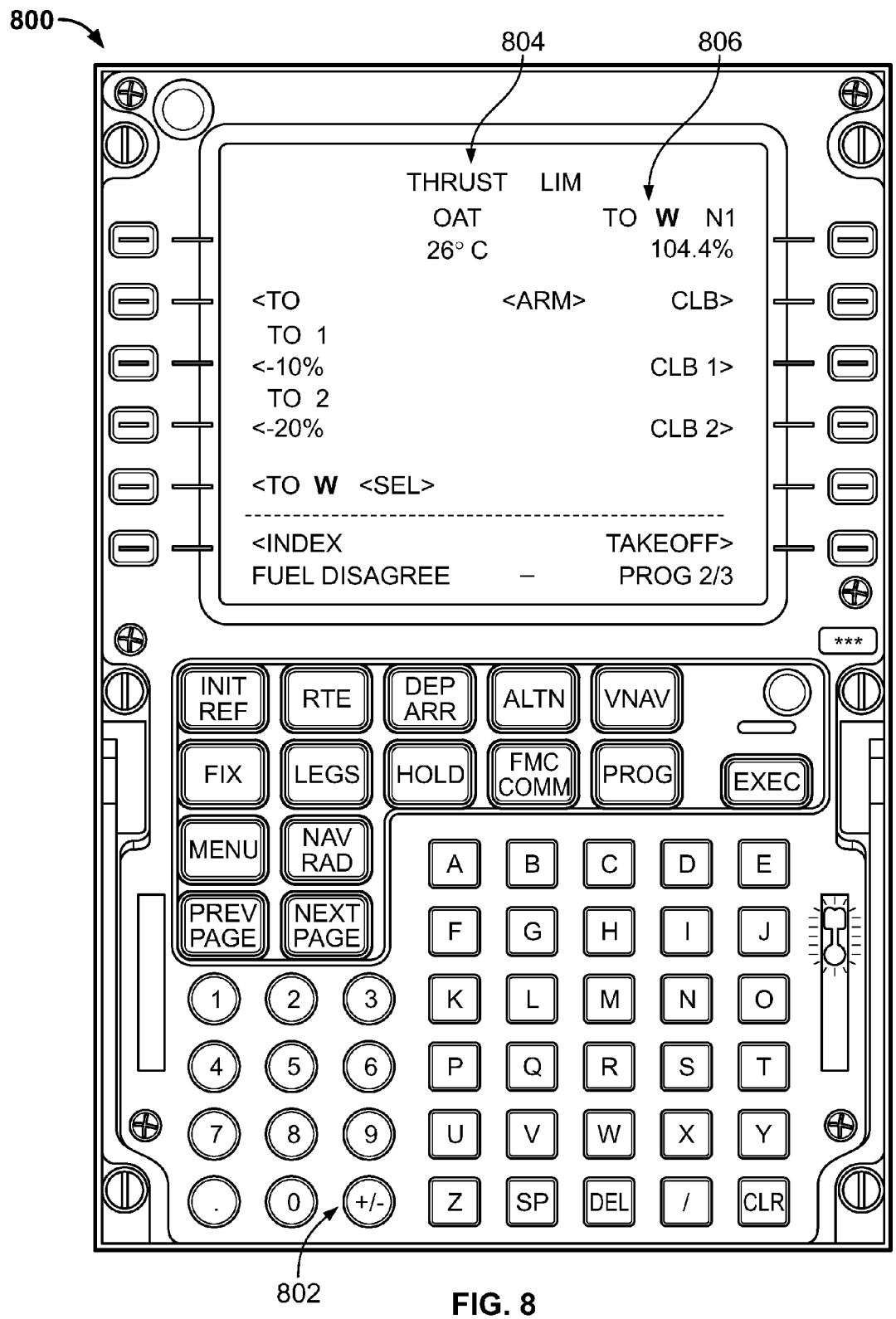
FIG. 8 illustrates an example control display unit, which may be used to implement the example takeoff management system of FIG. 7.

FIG. 8 illustrates an example control display unit 800 disclosed herein, which may be used to implement the example control display unit 614 of FIGS. 6-7. In the illustrated example, the control display unit 800 includes a keyboard 802 and a display 804. In the illustrated example, the keyboard 802 may be used to provide inputs and/or selections related to a flight plan of the aircraft 100. For example, a crew member of the aircraft 100 may use the control display unit 800 to toggle between and/or select one of a plurality of takeoff modes such as, for example, the normal thrust mode, the bump thrust mode, and the fluid cooling thrust mode. In the illustrated example, a message 806 is displayed via the example display 804 indicating that the fluid cooling thrust mode is selected. The example message 806 of FIG. 8 is "TO W." However, "TO W" is merely an example and, thus, other messages may be employed in other examples.

Figure 9:
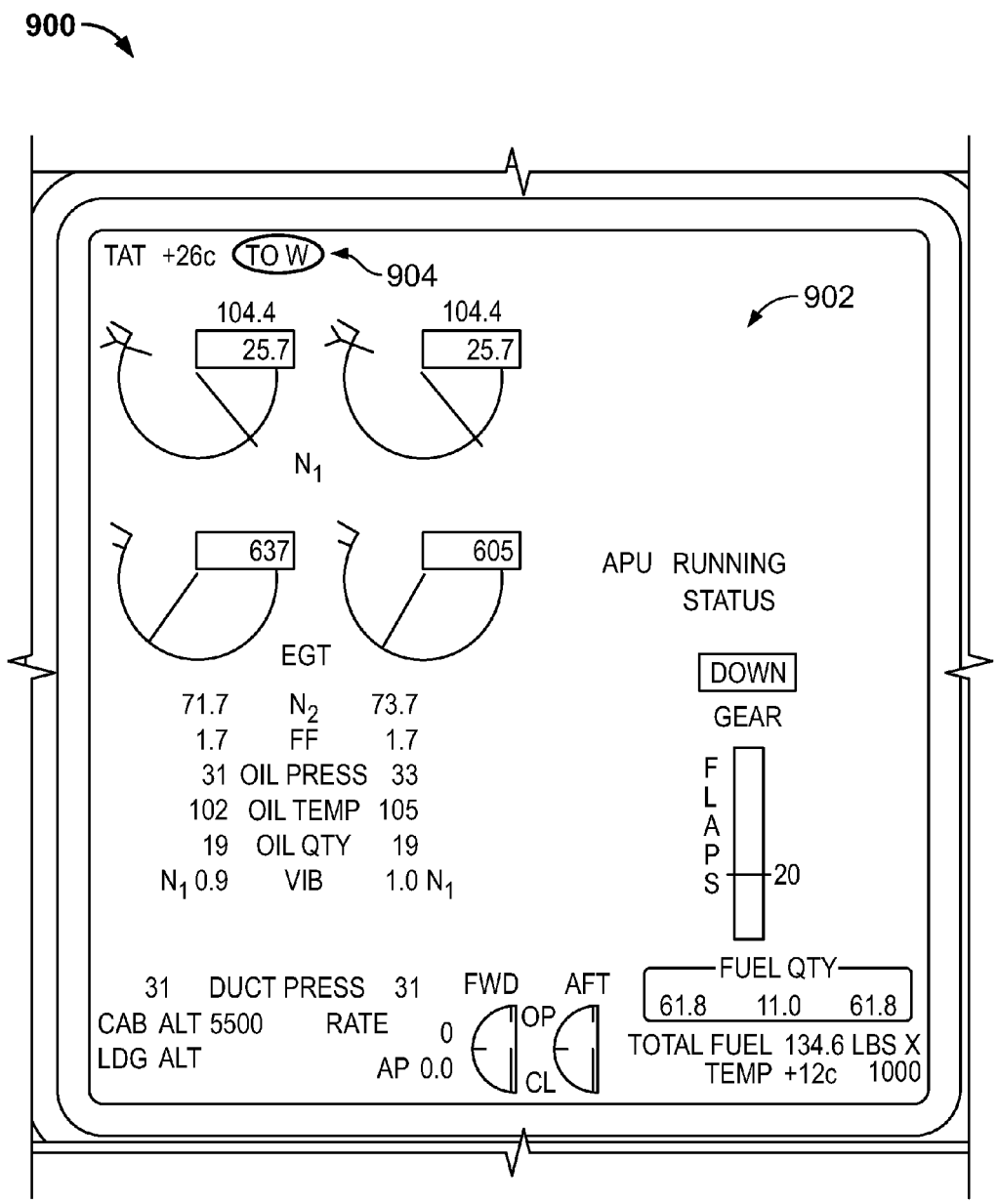
FIG. 9 illustrates an example engine indication and crew alert system display disclosed herein, which may be used to implement the example takeoff management system of FIG. 7.

FIG. 9 illustrates an example EICAS display 900 disclosed herein, which may be used to implement the example EICAS display 704 of FIG. 7. In the illustrated example, the EICAS display 900 displays a plurality of parameters 902 of the aircraft 100. The example EICAS display 900 of FIG. 9 also displays a message 904, "TO W," to indicate that the fluid cooling thrust mode is selected via the control display unit 614 and both the first fluid level status and the second fluid level status are "Full." In other examples, the EICAS display 900 displays other messages related to the example first fluid delivery system 200 and/or the example second fluid delivery system 201.

In some examples, the EICAS display 900 displays one or more indications of temperatures of the first engine heat source 202 and/or the second engine heat source 204. For example, if the first engine heat source 202 is to have a temperature within a first temperature range during takeoff, the EICAS display 900 may include an indication to indicate that the first engine heat source 202 is within the first temperature range or outside of the first temperature range. Thus, the crew of the example aircraft 100 may monitor an efficacy of the example first fluid delivery system 200 and/or the example second fluid delivery system 201 during takeoff.

Figure 10:
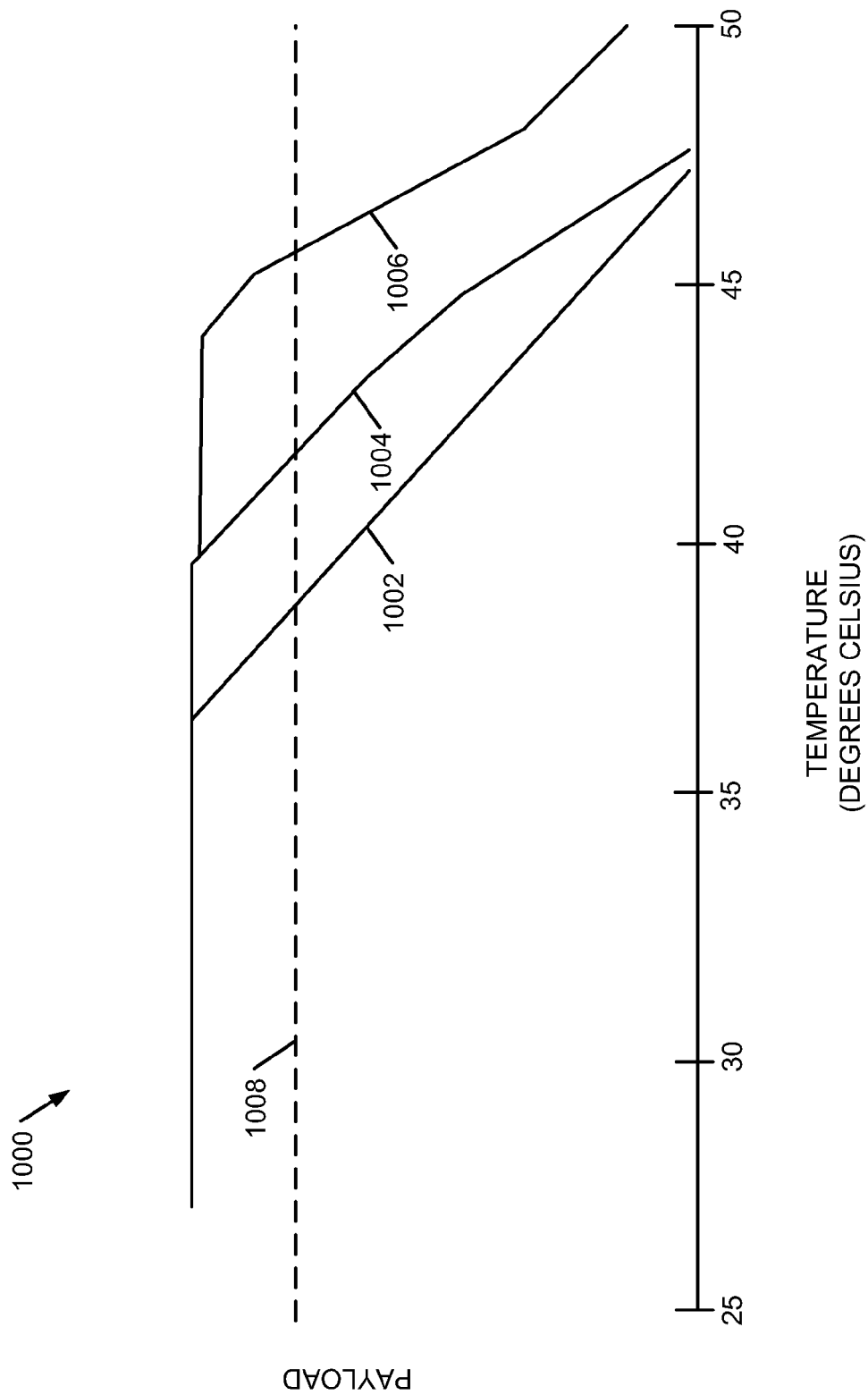
FIG. 10 is a graph illustrating a payload capacity of the example aircraft 100 as a function of environmental temperature.

FIG. 10 is a graph 1000 illustrating a payload capacity of the example aircraft 100 as a function of environmental temperature. In the illustrated example, a first line 1002 represents the payload capacity of the aircraft 100 operating in the normal thrust mode. A second line 1004 represents the payload capacity of the aircraft 100 operating in the bump thrust mode, and a third line 1006 represents the payload capacity of the aircraft 100 operating in the fluid cooling thrust mode. The example payload capacity of the aircraft 100 is affected by environmental temperatures. For example, material temperature thresholds of the first engine 108 and/or the second engine 110 may limit an amount of thrust that may be generated by the first engine 108 and the second engine 110, respectively, during takeoff. Thus, as shown by slopes of the first line 1002, the second line 1004, and the third line 1006, the payload capacity of the aircraft decreases when the aircraft is to takeoff in, for example, high temperature environments.

In the illustrated example, the payload capacity of the aircraft 100 operating in the fluid cooling thrust mode exceeds a full passenger payload, which is represented by dashed line 1008, in temperatures below approximately forty-six degrees Celsius. The example payload capacity of the aircraft 100 operating in the bump thrust mode exceeds the full passenger payload in temperatures below approximately forty-two degrees Celsius, and the example payload capacity of the aircraft 100 operating in the normal mode exceeds the full passenger payload in temperatures below approximately 39 degrees Celsius. Thus, the example first fluid delivery system 200 and the example second fluid delivery system 201 increase a range of environmental temperatures in which the example aircraft 100 may takeoff. The above-noted temperatures are merely examples and, thus, other example aircrafts employing the example methods and apparatus disclosed herein may have different payload capacities at different temperatures.

While an example manner of implementing the example fluid management system 610 of FIG. 6 is illustrated in FIG. 7, one or more of the elements, processes and/or devices illustrated in FIG. 7 may be combined, divided, re-arranged, omitted, eliminated and/or implemented in any other way. Further, the example first fluid delivery system 200, the example second fluid delivery system 201, the example fluid management system 610, the example electronic engine control 612, the example control unit display 614, the example flight management system 701, the example engine indication and crew alert system 702, the example EICAS display 704, the example FDS controller 706, the example flight phase determiner 708, the example FDS state determiner 710, the example pressure sensors 712, the example fluid level sensors 714, the example valves 716, the example pumps 718 and/or, more generally, the example takeoff management system 700 of FIG. 7 may be implemented by hardware, software, firmware and/or any combination of hardware, software and/or firmware. Thus, for example, any of the example first fluid delivery system 200, the example second fluid delivery system 201, the example fluid management system 610, the example electronic engine control 612, the example control unit display 614, the example flight management system 701, the example engine indication and crew alert system 702, the example EICAS display 704, the example FDS controller 706, the example flight phase determiner 708, the example FDS state determiner 710, the example pressure sensors 712, the example fluid level sensors 714, the example valves 716, the example pumps 718 and/or, more generally, the example takeoff management system 700 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first fluid delivery system 200, the example second fluid delivery system 201, the example fluid management system 610, the example electronic engine control 612, the example control unit display 614, the example flight management system 701, the example engine indication and crew alert system 702, the example EICAS display 704, the example FDS controller 706, the example flight phase determiner 708, the example FDS state determiner 710, the example pressure sensors 712, the example fluid level sensors 714, the example valves 716, the example pumps 718 and/or, more generally, the example takeoff management system 700 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example takeoff management system 700 of FIG. 7 may include one or more elements, processes and/or devices in addition to, or instead of, those illustrated in FIG. 7, and/or may include more than one of any or all of the illustrated elements, processes and devices.

Figure 11:
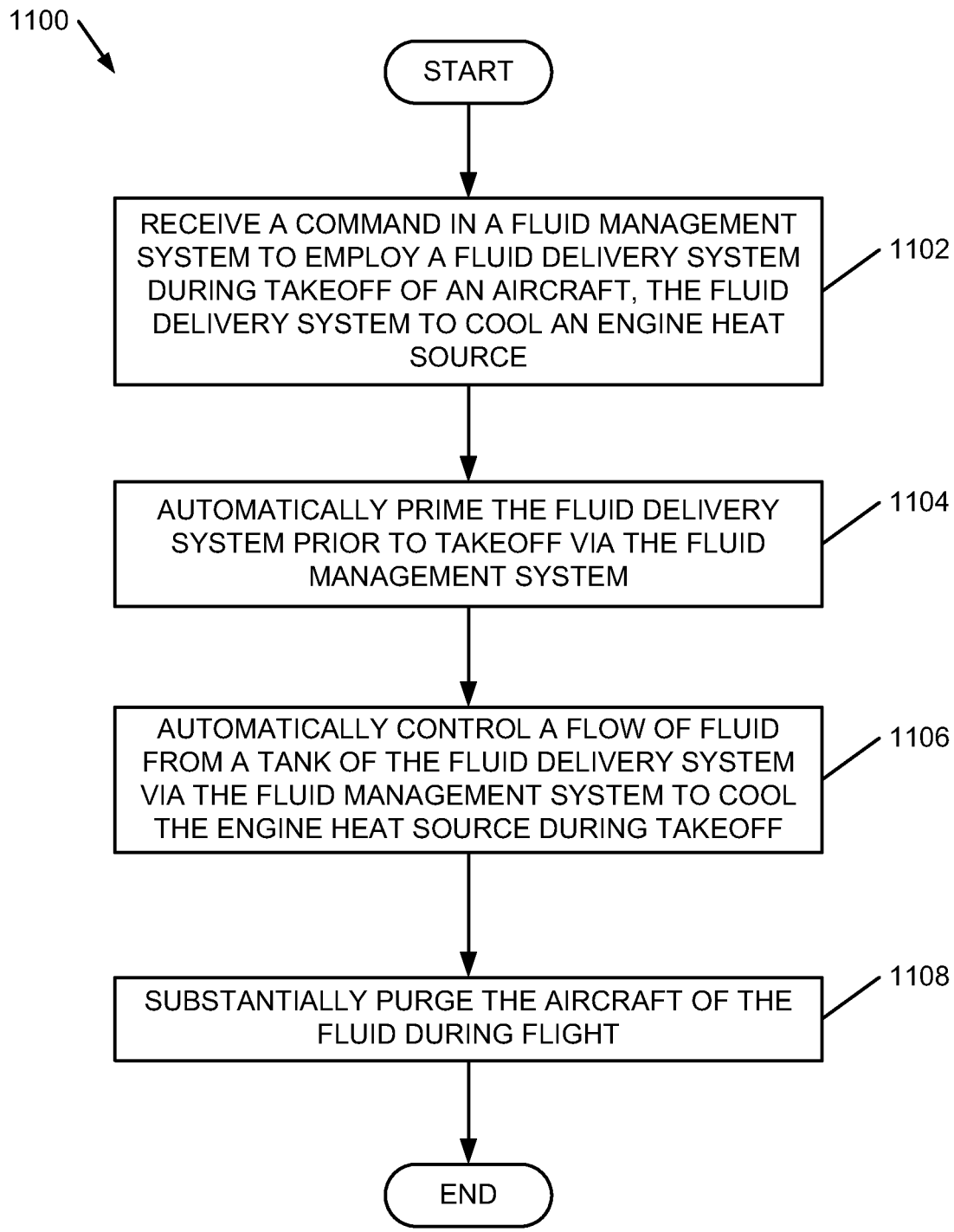
FIG. 11 is a flow diagram representative of an example method disclosed herein.
Figure 12:
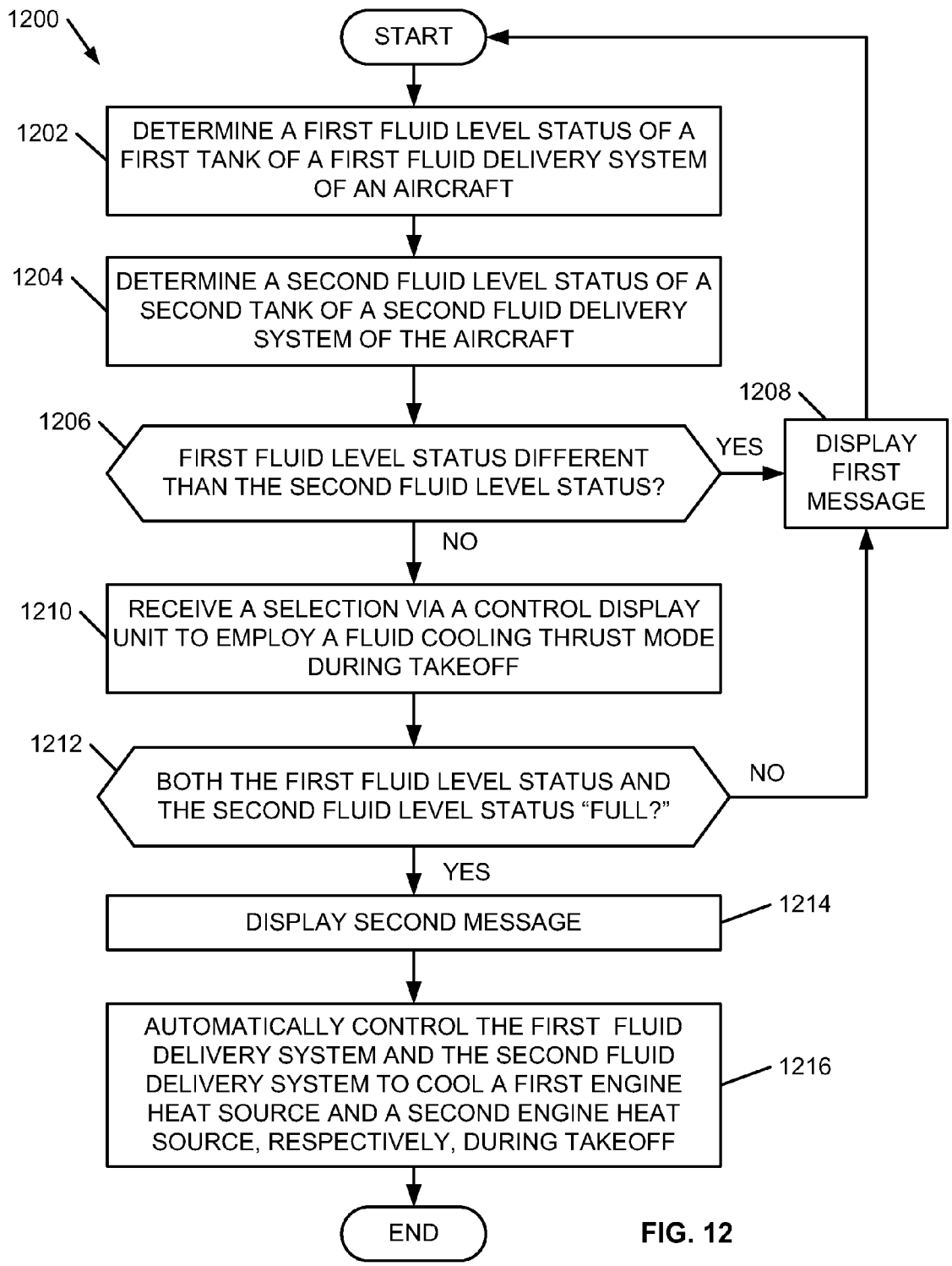
FIG. 12 is a flow diagram representative of another example method disclosed herein.

Flowcharts representative of example methods for implementing the takeoff management system 700 of FIG. 7 is shown in FIGS. 11-12. In these examples, the methods may be implemented using machine readable instructions comprising a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example methods are described with reference to the flowcharts illustrated in FIGS. 11-12, many other methods of implementing the example takeoff management system 700 may alternatively be used. For example, the order of execution of the blocks may be changed, and/or some of the blocks described may be changed, eliminated, or combined.

As mentioned above, the example methods of FIGS. 11-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 1100 of FIG. 11 begins at block 1102 by the example fluid management system 610 receiving a command to employ the example first fluid delivery system 200 during takeoff of the aircraft 100. In some examples, a selection of the fluid cooling thrust mode is input from a crew member via the control display unit 614 in conjunction with flight planning, and the command is communicated to the fluid management system 610 (e.g., via the flight management system 701). As described below in conjunction with FIG. 12, one or more messages may be displayed via the control display unit 614 and/or the EICAS display 704 based on the selection input by the crew member(s) and the fluid level statuses of the first tank 206 and the second tank 208.

At block 1104, the fluid management system 610 automatically primes the first fluid delivery system 200 prior to takeoff of the aircraft. In some examples, the FDS controller 706 automatically initiates operation of the first fluid delivery system 200 to prime the first fluid delivery system 200 when the fight phase determiner 708 determines that the fluid cooling thrust mode is selected via the control display unit 614. In other examples, the FDS controller 706 initiates operation of the first fluid delivery system 200 to prime the first fluid delivery system 200 in response to other events and/or at other times.

In some examples, the FDS controller 706 of the fluid management system 610 automatically controls the pump 402, the first supply valve 406 and the second supply valve 407 to prime the first fluid delivery system 200. For example, the FDS controller 706 may open the first supply valve 406, close the second supply valve 407, and operate the pump 402 to pressurize the first portion 408 of the heat source feed flowline 400 between the pump 402 and the second supply valve 407. In some examples, the FDS state determiner 710 determines a pressure in the first portion 408 of the heat source feed flowline 400 based on information generated via the pressure sensors 712 (e.g., the pressure sensor 608 of FIG. 6). If the FDS state determiner 710 determines that the pressure is above a predetermined pressure, the FDS state determiner 710 determines that the first fluid delivery system 200 is primed. In some examples, if the pressure is above the predetermined pressure, the EICAS displays a message such as, for example, "TO W" via the EICAS display 704. In some examples, if the pressure is not above the predetermined pressure, a message may be displayed via the EICAS display 704 such as, for example, "Do Not Dispatch" and/or any other message.

At block 1106, the fluid management system 610 automatically controls a flow of the fluid 222 from the first tank 206 of the first fluid delivery system 200 to cool the first engine heat source 202 of the aircraft 100 during takeoff. For example, the FDS controller 706 may operate the pump 402 and open the second supply valve 407 to enable the fluid 222 to flow into and through the second portion 410 of the heat source feed flowline 400. As a result, the fluid 222 cools the first engine heat source 202 and enables the example aircraft 100 to takeoff, for example, with a full passenger and/or cargo payload in high temperature environments.

In some examples, in response to the selection of the fluid cooling thrust mode, the FDS controller 706 automatically initiates operation of the first fluid delivery system 200 to cool the first engine heat source 202 (e.g., opens and/or closes selected ones of the valves 716, energizes the pump(s) 718, and/or performs other actions) when the flight phase determiner 708 determines that the aircraft 100 is in the takeoff roll phase. In other examples, the FDS controller 706 automatically initiates operation of the first fluid delivery system 200 to cool the first engine heat source 202 at other times.

At block 1108, the fluid management system 610 substantially purges the aircraft 100 of the fluid 222 during flight of the aircraft 100. For example, the FDS controller 706 may open the first drain valve 414 to drain the fluid 222 in the heat source drain line 412 and the fill flowline 210 from the example aircraft 100, open the second drain valve 416 to drain the fluid 222 in the first tank 206 from the example aircraft 100, and operate the pump 402 to exhaust the fluid 222 in the heat source feed flowline 400 from the aircraft 100 via the exhaust port 404. By substantially purging the fluid 222 from the example aircraft 100, no amount of fluid 222 large enough to freeze and damage or block components of the first fluid delivery system 200 and/or the second fluid delivery system 201 remains on the aircraft 100 during flight. Further, substantially purging the fluid 222 from the example aircraft 100 during flight minimizes a weight of the first fluid delivery system 200 and/or the second fluid delivery system 201 during flight, thereby increasing a fuel efficiency of the aircraft 100.

In some examples, the FDS controller 706 controls the first fluid delivery system 200 and/or the second fluid delivery system 201 to purge the fluid 222 from the aircraft 100 when the flight phase determiner 708 detects a transition of the aircraft 100 from the takeoff roll phase to the climbing phase. In some examples, the FDS controller 706 controls the first fluid delivery system 200 and/or the second fluid delivery system 201 to purge the fluid 222 from the aircraft 100 when the flight phase determiner 708 determines that a predetermined amount of time (e.g., five minutes) has passed since the occurrence of a takeoff event and/or detection of a predetermined flight phase. For example, the fluid 222 may be purged from the aircraft 100 upon the first one of initiation of the climbing phase or completion of five minutes of cooling via the first fluid delivery system 200 and/or the second fluid delivery system 201. In other examples, the FDS controller 706 controls the first fluid delivery system 200 to purge the aircraft 100 of the fluid at other times.

FIG. 12 illustrates another example method 1200 disclosed herein. The example method 1200 of FIG. 12 begins at block 1202 by the FDS state determiner 710 determining a first fluid level status of the first tank 206 of the first fluid delivery system 200. For example, the FDS state determiner 710 may determine a first amount of fluid in the first tank 206 prior to takeoff. If the first amount of fluid in the first tank 206 is greater than a predetermined amount, the FDS state determiner 710 may determine that the first fluid level status is "Full." In some examples, if the first amount of fluid in the first tank 206 is not greater than the predetermined amount, the FDS state determiner 710 determines that the first fluid level status is "Empty." Other examples may employ other statuses. At block 1204, the FDS state determiner 710 determines a second fluid level status of the second tank 208 of the second fluid delivery system 201.

At block 1206, the EICAS 702 determines if the first fluid level status is different than the second fluid level status. If the first fluid level status is different than the second fluid level status, the example EICAS 702 displays a first message via the EICAS display 704 at block 1208. For example, the first message may be a warning such as, for example, "Do Not Dispatch," "DND" and/or any other message. In response to the first message, a crew of the aircraft 100 may take one or more actions such as, for example, requesting draining or filling one of the first tank 206 or the second tank 208. The example method 1200 then returns to block 1202.

If the first fluid level status is the same or matches the second fluid level status, the flight management system 701 receives a selection via the control display unit 614 to employ a fluid cooling thrust mode during takeoff at block 1210. In some examples, the crew may toggle between available thrust modes and select the fluid cooling thrust mode using the keyboard 802 of the example control display unit 800 of FIG. 8.

At block 1212, the EICAS 702 determines if both the first fluid level status and the second fluid level status are "Full." If both the first fluid level status and the second fluid level status are not "Full," the EICAS 702 displays the first message at block 1208. The first message may be a warning such as, for example, "ENG WATER SYS DISAGREE." In some examples, if the first fluid level status and the second fluid level state are not "Full" and the fluid cooling thrust mode is selected, the example EEC 612 determines that one of the normal thrust mode or the bump thrust mode is to be employed during takeoff.

If both the first fluid level status and the second fluid level status are "Full," the EICAS 702 displays a second message via, for example, the EICAS display 704 at block 1214. In some examples, the second message indicates that the fluid cooling thrust mode is to be implemented during takeoff via the takeoff management system 700. Thus, the example EICAS 702 displays the first message and/or the second message based on the amount of fluid in the first tank 206 and the second tank 208 and the thrust mode selection. At block 1216, the FDS controller 706 automatically controls the first fluid delivery system 200 and the second fluid delivery system 201 to cool the first engine heat source 202 and the second engine heat source 204, respectively, during takeoff of the aircraft 100.

Figure 13:
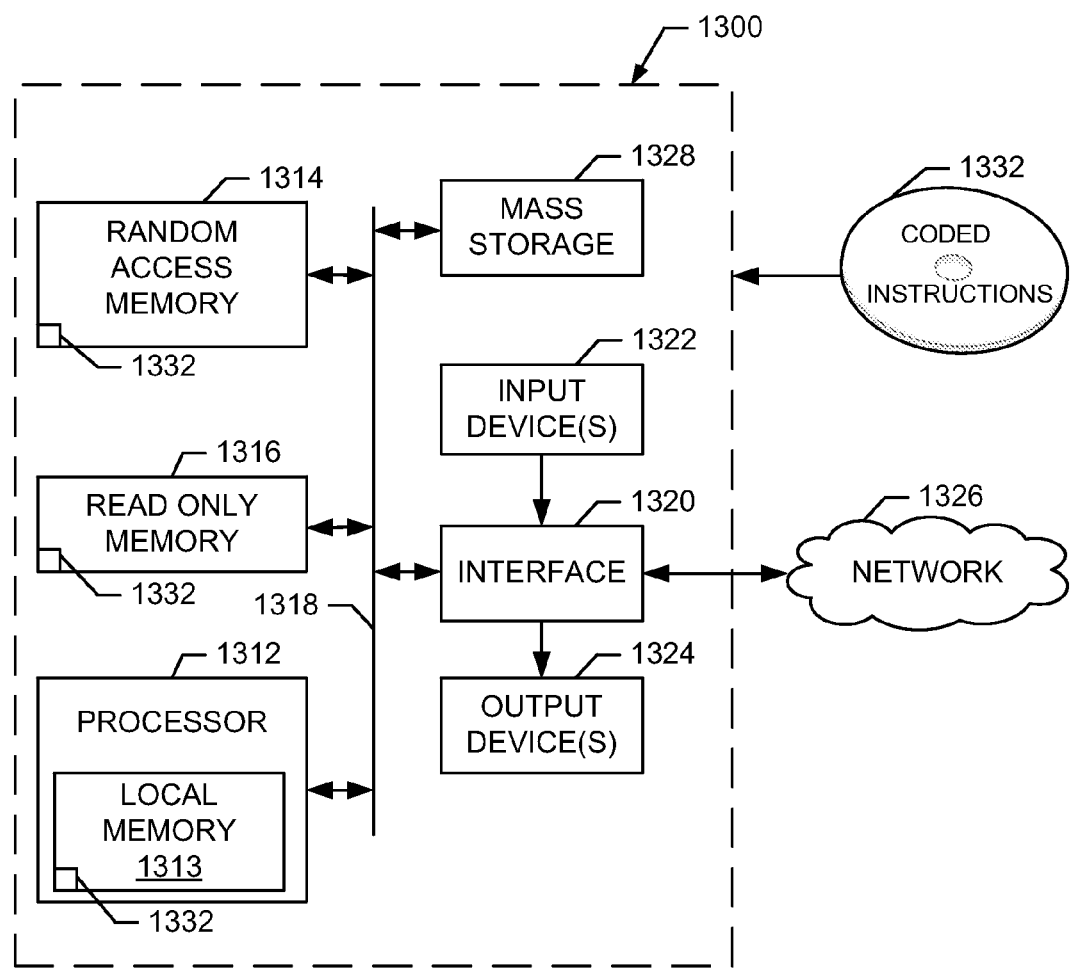
FIG. 13 is a block diagram of an example processor platform that may be used to implement the example methods of FIGS. 11-12.

FIG. 13 is a block diagram of an example processor platform 1300 capable of executing instructions to implement the example methods of FIGS. 11-12 to implement the takeoff management system 700 of FIG. 7. The processor platform 1300 can be, for example, one or more aircraft computing systems, a server, an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 of FIG. 13 to implement the examples herein may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods and apparatus enable an engine of an aircraft to be cooled during takeoff, thereby increasing a life of the engine and/or generating an increased amount of thrust in high temperature environments. As a result, the example methods and apparatus disclosed herein increase a payload capacity and/or a life of the aircraft. Thus, the aircraft may perform more flights and/or carry more passengers and/or cargo than traditional aircraft. Further, the example methods and apparatus disclosed herein may enable the example aircraft to takeoff in, for example, the high temperature environments while traditional aircraft are prevented from taking off until environmental temperatures decrease. Thus, the example methods and apparatus disclosed herein may reduce or prevent departure delays.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a first tank and a second tank disposed on an aircraft;
a first pump in fluid communication with the first tank and a second pump in communication with the second tank, the first pump to pump water from the first tank and the second pump to pump water from the second tank to cool an engine heat source; and
a fluid management system including a processor to:
determine a first amount of water in the first tank and a second amount of water in the second tank;
perform a comparison of the first amount and the second amount to determine if the first amount and the second amount satisfy a predetermined fluid level;
determine a thrust mode for the aircraft; and
automatically control the first pump and the second pump to control flow of the water during takeoff of the aircraft based on the thrust mode and the determination that the first amount and the second amount satisfy the predetermined fluid level.

2. The apparatus of claim 1 further comprising a port in fluid communication with the first tank, at least one of the water, water vapor or steam to exhaust from the aircraft via the port.

3. The apparatus of claim 1 further comprising a fill flowline in fluid communication with the first tank, the first tank to receive the water via the fill flowline.

4. The apparatus of claim 1 further comprising a drain valve in communication with the first tank, the water from the first tank to drain from the aircraft via the drain valve when the fluid management system opens the drain valve.

5. The apparatus of claim 1 further comprising a valve to control the flow of the water from the first tank to the engine heat source, the fluid management system to automatically control the valve.

6. The apparatus of claim 1 further comprising a control display unit in communication with the fluid management system, the control display unit to display a message prior to takeoff to indicate if the first tank is filled with a predetermined amount of water.

7. The apparatus of claim 1, wherein the first tank is disposed in a dry bay of a wing of the aircraft.

8. The apparatus of claim 1, wherein the thrust mode corresponds to a first flight event of the aircraft and the fluid management system is to further:
determine a second flight event of the aircraft, the second flight event different from the first flight event; and
automatically control the first pump and the second pump to control flow of the water during takeoff of the aircraft based on the second flight event.

9. The apparatus of claim 8, wherein the second flight event includes a predetermined amount of power provided to an engine of the aircraft or initiation of a rolling takeoff.

10. A method, comprising:
receiving a selection for a thrust mode of an aircraft via a control display unit;
determining whether to employ a fluid delivery system during takeoff of the aircraft based on the selection, the fluid delivery system including a first fluid delivery system including a first tank disposed on the aircraft and a second fluid delivery system including a second tank disposed on the aircraft;
determining a first amount of water in the first tank and a second amount of water in the second tank;
performing a comparison of the first amount and the second amount to determine if the first amount and the second amount satisfy a predetermined fluid level; and
automatically controlling, via a fluid management system including a processor, a flow of water from the first tank and the second tank during takeoff based on the determination of whether to employ the fluid delivery system and the determination that the first amount and the second amount satisfy the predetermined fluid level, the water to cool an engine heat source of the aircraft.

11. The method of claim 10 further comprising
displaying a message via the control display unit based on the first amount of water in the first tank and the second amount of water in the second tank.

12. The method of claim 11, wherein displaying the message comprises displaying a warning if the amount of water in the first tank is less than a predetermined amount of water.

13. The method of claim 10 further comprising automatically priming the fluid delivery system prior to takeoff via the fluid management system.

14. The method of claim 10 further comprising:
receiving a selection via a control display unit to not employ the fluid delivery system during takeoff; and
displaying a warning via the control display unit if an amount of water in the first tank is greater than a predetermined amount of water.

15. The method of claim 10 further comprising purging the water from the aircraft in flight.

* * * * *